Oct. 5, 1954
R. C. LUNDQUIST
2,690,834
ARTICULATED CONVEYER
Filed May 4, 1953
2 Sheets-Sheet 1
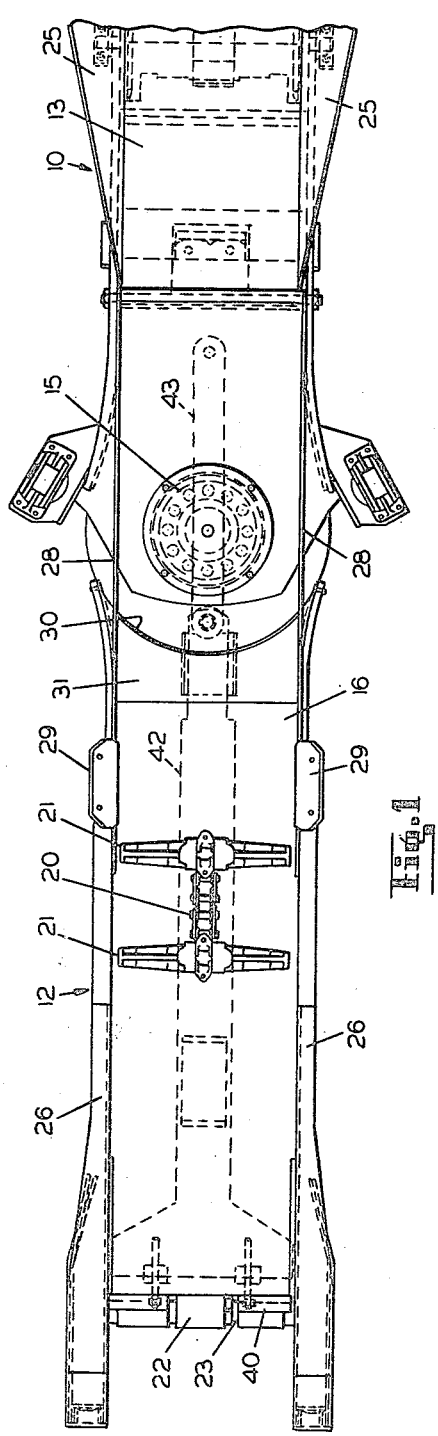
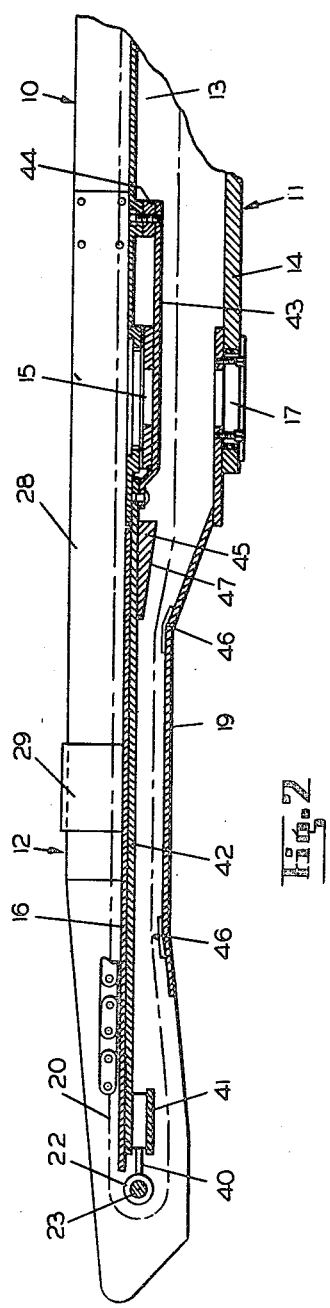
INVENTOR.
Richard C. Lundquist
BY
Murray T. Gleeson
ATTORNEY

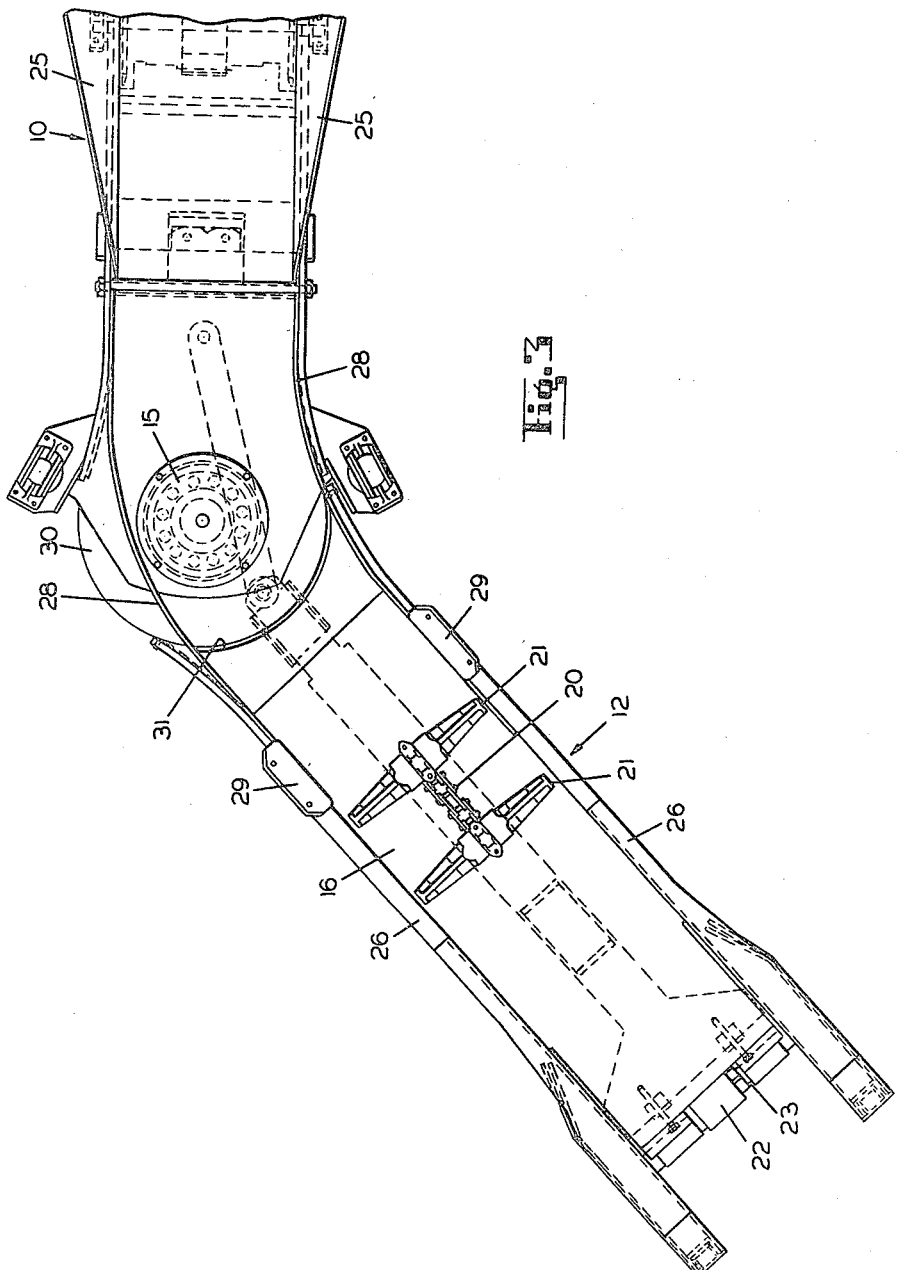

Patented Oct. 5, 1954

2,690,834

UNITED STATES PATENT OFFICE 2,690,834

ARTICULATED CONVEYER

Richard C. Lundquist, Chicago, Ill., assignor to Goodman Manufacturing Company, Chicago, Ill., a corporation of Illinois Application May 4, 1953, Serial No. 352,887

1 Claim. (Cl. 198—109)

This invention relates to improvements in articulated conveyors of the center chain and flight type, especially adapted for use in mobile loading machines, and has for its principal object to provide an improved and simplified form of conveyor takeup for the chain idler at the extreme end of the articulated conveyor of the type mentioned.

Articulated conveyors of the type used in loading machines are usually made up of two or more trough sections connected by a suitable swivel joint, with a pair of flexible side wall elements extending between them, providing end bearing abutments for guiding the chain flights as they pass along the trough sections and around the jointed connections when one section is swung laterally relative to another. As is well known with devices of this general character, there is a tendency for the conveyor chain to become slackened when two of the sections are swung laterally out of longitudinal alignment with each other, the amount of slack being generally proportional to the degree of angularity between the two connected trough sections.

In carrying out my invention, I provide an improved and simplified form of automatic conveyor chain takeup for the purpose above described.

The invention may best be understood by reference to the accompanying drawings, in which:

Figure 1 is a fragmentary plan view of an articulated conveyor of the type used on a loading machine, and embodying an illustrative form of my invention;

Figure 2 is a longitudinal section of the conveyor shown in Figure 1;

Figure 3 is a plan view similar to Figure 1, but showing one section of the conveyor swung at an angle to another section.

Referring now to details of the embodiment of the invention shown in the drawings, Figure 1 is a plan view illustrating the invention as applied to the rear end of an articulated conveyor of the type adapted for use in mobile loading machines. In this figure, a forward section of the conveyor, indicated generally at 10, is of the kind suitably mounted on the main frame 11 of a loading machine, with a rear or delivery end section of the conveyor, indicated generally at 12, connected thereto. The front conveyor section comprises an upper trough plate 13 and a lower trough plate 14 spaced therefrom, which may also be a part of the main frame. The upper plate 13 has a centrally disposed pivot bearing 15 affording pivotal connection with an upper trough plate 16 of the rear conveyor section. A lower pivot bearing 17 is mounted in a lower plate 14 of the front section in vertical coaxial alignment with the first-named bearing member 15 affording pivotal connection with a lower plate 19 of the rear section.

The flight conveyor is of conventional form, consisting of an endless chain 20 having spaced elongated flights 21, 21 extending in opposite directions therefrom. The chain 20 is trained over an idler sprocket 22 on a transverse shaft 23 disposed beyond the rear end of the upper trough plate 16 of the rear conveyor section and adjustable longitudinally with relation to the latter, as will hereinafter more fully appear.

The front trough section has fixed upstanding side walls 25, 25 therealong, terminating substantially forwardly of the vertical axis formed by the bearings 15, 17. The rear section 12 also has fixed upstanding side walls 26, 26, terminating substantially rearwardly of the axis of swinging movement of the two sections about their pivot bearings 15, 17. The gaps between the two pairs of side walls is closed, as by a pair of flexible side plates 28 which, in the form shown herein, are fixed to the rear ends of the side walls 25 on the front section and have sliding engagement in suitable brackets 29, 29 fixed near the front ends of the side walls 26 of the rear section.

As is usual with articulated conveyors of this type, the upper trough plate 13 of one section, as for instance the front section 10, is flared outwardly near its rear end and terminates in a widened arcuate convex portion 30 which has interfitting engagement with a concave widened front end portion 31 of the rear conveyor plate 19. The widened convex and concave plate portions 30 and 31 are arranged at substantially the same level so as to permit the conveyor chain and the material carried thereby to pass thereacross with minimum impedance.

Referring now more particularly to the novel features which comprise the present invention, the transverse shaft 23 of the rear idler sprocket 22 has bearing at opposite ends in an adjusting frame 40 which is slidably mounted for longitudinal movement between the upper trough plate 16 of said rear conveyor section and a transverse guide plate 41 fixed to the side walls 26, 26 of the rear conveyor section 12.

A longitudinal bar 42 is fixed at its rear end to the adjusting frame 40 and extends forwardly centrally of and beneath the conveyor plate 19 to a point adjacent the rear of the upper pivot bearing 15. A link 43 is pivotally connected to the front end of the bar 42 and extends forwardly beneath the upper pivot bearing 15 to a point forwardly thereof where said link is pivotally connected to a depending boss 44 carried below the upper plate 13 of the front section 10. The link 43 is preferably offset downwardly where it passes below said pivot bearing, as shown in Figure 2, to provide clearance beneath the upper pivot bearing 15.

A transverse guide bar 45 has its opposite ends suitably fixed to side walls 26 of the rear conveyor section 12 with sufficient space between said guide plate and the bottom of the upper plate 16 to afford sliding endwise movement of the bar 42 while guiding said bar in a central position relative to the rear conveyor section 12 in all positions of lateral swinging movement.

In the form shown herein, the bottom plate 19 of the rear section 12 may also have wear plates 46, 46 spaced along its upper surface to elevate the lower reach of the conveyor chain and afford increased head room beneath the intermediate portion of the rear conveyor section 12. With this arrangement, the under face of the guide bar 45 is inclined downwardly toward the front conveyor section at 47 to guide the lower reach of the conveyor chain beneath the path of swinging movement of the link 43.

As will be seen from Figures 1 and 3, the length of the link 43, which is pivotally connected to the front end of the takeup bar 42, is such that, when pivoted in the longitudinal center line of the front section 10, said link will cause the takeup bar 42 to be extended automatically a sufficient distance to compensate for otherwise normal slackening of the conveyor chain as the rear end section is swung laterally toward one side or the other of the longitudinal center line of the front section 10.

I claim:

In an articulated conveyor, two trough sections horizontally swingable with respect to each other about an upright axis and each having side walls including flexible side wall portions at opposite sides of the axis of swinging movement of said trough sections, an endless conveyor extending along said trough sections and trained over a rotatable shaft at the end of one of said trough sections, said shaft being mounted on a frame guided for slidable longitudinal movement relative to its adjacent trough section, a bar connected to said frame and extending to a point adjacent, but short of, the point of pivotal connection of its respective trough section and the other trough section, guide means affording longitudinal sliding movement of said bar relative to its trough section, and a link pivotally connected centrally of the front end of said bar and extending across and beneath the pivotal connection of said trough sections, with the opposite end of said link pivotally connected centrally of the second-named trough section, said bar and link being arranged to compensate for variations in tension of the conveyor chain due to lateral swinging movement of the trough sections relative to each other.

References Cited in the file of this patent

UNITED STATES PATENTS

| Number | Name | Date |
|---|---|---|
| 2,613,800 | Merck | Oct. 14, 1952 |
| 2,646,871 | Lundquist | July 28, 1953 |